United States Patent [19]
Fouquet et al.

[11] Patent Number: 5,609,364
[45] Date of Patent: Mar. 11, 1997

[54] ENERGY-ABSORBING DEVICE, PARTICULARLY FOR AUTOMOBILE VEHICLE STEERING COLUMNS

[75] Inventors: Jean-Michel Fouquet; Benoît Duval; Eddy DuPont, all of Vendome, France

[73] Assignee: NACAM, Vendome, France

[21] Appl. No.: 369,096

[22] Filed: Jan. 5, 1995

[30] Foreign Application Priority Data

Jan. 6, 1994 [FR] France ................................. 94 00085

[51] Int. Cl.⁶ ................................................. B62D 1/11
[52] U.S. Cl. ................................... 280/777; 74/492
[58] Field of Search .................................. 280/777, 775; 74/492, 493

[56] References Cited

U.S. PATENT DOCUMENTS 5,174,409  12/1992  Osawa ................................. 280/777 X
5,356,179  10/1994  Hildebrandt et al. .................. 280/777

FOREIGN PATENT DOCUMENTS 0462443  12/1991  European Pat. Off. ................ 74/492
1731670  5/1992  U.S.S.R. ............................... 280/777

*Primary Examiner*—Christopher P. Ellis
*Attorney, Agent, or Firm*—Emmanuel J. Lobato

[57] ABSTRACT

An energy-absorbing device disposed between two elements which are movable apart from each other in response to an externally applied force. The device has a wire coil winding having a plurality of turns at one end and a rectilinear length portion at another end extending away from a turn of the coil winding. One of the two elements has a support axis about which the coil winding turns are would axially thereof. A second of the two elements has an end of the rectilinear length portion of the wire secured thereto. The turns of the coil winding are deformable and unwind about the axis to absorb energy of a force applied in a direction parallel to the rectilinear relatively separating apart the two elements. The energy device is uable on automobile vehicle steering columns for absorbing impact forces.

11 Claims, 4 Drawing Sheets

ENERGY-ABSORBING DEVICE, PARTICULARLY FOR AUTOMOBILE VEHICLE STEERING COLUMNS

BACKGROUND OF THE INVENTION

The present invention is an energy-absorbing device, applicable in particular to automobile vehicle steering columns, with a view to absorbing energy in the event of an impact.

Many energy-absorbing systems or devices are known, but they are often relatively bulky and therefore not easily usable in structures having limited available volume. The dimensioning of the energy-absorbing device as well as its cost and complexity are the most frequently encountered drawbacks.

Document EP-0-252-031 describes an energy-absorbing device comprising two elements mobile in translation with respect to each other, one of the elements supporting two axes about which are rolled, respectively, two metal bands forming a spiral, one of the ends of each band being rigidly locked to an axis whereas the other end is fixed to the other element. During energy absorption, the two elements move closer to each other causing the two metal bands to unwind. When metal bands forming spirals are used, the higher the force to be reached and the longer the absorption distance of travel required, the larger the energy-absorbing device has to be.

Document GB-1.120.799 describes a steering column, comprising two telescopic parts which fit one inside the other and provided with an energy-absorbing device. The latter is made up of two systems, the first formed of a foldable piece, and the second of two metal bands, absorbing a part of the energy by bending and elongation.

Document GB-2.268.125 concerns an automobile vehicle steering column, comprising an energy-absorbing device made up of a rigid support coupled to the steering tube and having two longitudinal slots, parallel to the axis of the column. A bolt connects this support to a console in order to allow the adjustment of the steering column. This bolt is associated with a deformable band, welded to the support. This device adsorbs the energy at the time of an impact by displacement of the bolt towards the outside of the longitudinal slots, causing a displacement of the deformable strip. In this device, the absorption technique does not intervene at the time of the adjustment of the steering column, nor during the first phase of the impact.

A device adaptable to a steering column adjustable in inclination is described in U.S. Pat. No. 4,901,592. It comprises a U-shaped plate, the end of one of its branches being connected to the steering column and the other to a support fixed to the vehicle body. Energy absorption is performed by the displacement and deformation of the curved part of the U-shaped plate.

SUMMARY OF THE INVENTION

The object of the present invention is to propose an energy-absorbing device of relatively reduced overall dimensions, and of very simple design, which is capable of being easily mounted, in particular, in automobile vehicle steering column energy-absorbing devices, and which can absorb as constant a force as possible over a long distance of travel.

The invention therefore concerns an energy-absorbing device interposed between two elements which are able to move apart from each other under the action of an external force, said device essentially comprising a wire made up of a winding and a rectilinear part, the winding being arranged around a supporting axis, mounted on the first element, whereas the other end of the wire is fixed to the second element, the rectilinear part of the wire extending between the two elements, and being orientated substantially in the direction of the force, such that the traction exerted on the wire by the moving apart of the two elements causes the winding to unwind about the supporting axis and thus the absorption of the desired energy.

In one embodiment of the energy-absorbing device of the invention, the cross-section of the wire can be constant or evolutive. Similarly, the winding diameter of the wire on the supporting axis can be constant or evolutive.

The constituent matter of the wire is chosen so as to be able to withstand considerable traction forces. Accordingly, the wire can be made from metal, for example steel, or from a plastic material.

According to one embodiment of the invention, the first element is provided with a part having a general U shape, a rod extending between the wings of the U and to which it is fixed, said rod receiving a sleeve around which the wire is wound, and said sleeve being able to turn on said rod.

According to modified embodiment, the wire can be wound directly around the rod.

The other end of the wire is secured to the second element by any suitable means. For example, a securing plate can be welded to the end of the wire, if said wire is metallic, said plate comprising a passage hole for a means to secure said plate to the second element.

As mentioned above, the preferred application of the energy-absorbing device of the invention is in automobile vehicle steering columns. Such known columns comprise a steering shaft mounted in a body-tube, which is supported and locked to the vehicle body in the desired position. In such an application, at least one energy-absorbing device of the invention, of the type defined above, is provided between the body-tube and vehicle body.

Thus, the body-tube or any part rigidly locked to it can constitute the first element in the energy-absorbing device assembly, the vehicle body or any part rigidly locked to it then constituting the second element. However, in an modified embodiment, a reciprocal assembly is perfectly possible.

According to one embodiment of the invention, the steering column comprises such an energy-absorbing device, arranged on each side of the body tube. In this type of assembly, the wound part of the wire of each energy-absorbing device works with a supporting axis rigidly locked to the body-tube, whereas the other end of the wire is fixed to the vehicle body.

The invention provides an energy-absorbing device of simple design, having particularly reduced spatial requirements, while at the same time being capable of absorbing as constant a force as possible over a long distance of travel, which is of great interest in the case where such damper devices are used in the energy-absorbing systems of automobile vehicle steering columns.

The energy-absorbing system of the invention uses a wire wound in contiguous turns and provides substantial practical advantages, including among others:

the winding diameter of the wire is constant and because of this, the unwinding force is constant during the whole time of unwinding of the wire. And it is important to remember that the winding diameter is one of two fundamental parameters of the energy-absorbing level, the spatial requirement required to house the energy-absorbing system is smaller in diameter than in the case of a band system. In a band system, the higher the force to be reached (which requires a larger-diameter wire) and the longer the absorption distance of travel required (larger number of turns required), the larger the energy-absorbing device has to be, a wire type geometry (a single dimension to control) is easier to guarantee industrially than a band type geometry (two dimensions to control: thickness and width). And this is especially interesting since the diameter of the wire is the second fundamental parameter of the energy-absorbing level.

BRIEF DESCRIPTION OF THE DRAWINGS

The invention will now be described by means of non-limiting examples of a number of embodiments which must be read in conjunction with the attached drawings in which.

DESCRIPTION OF THE PREFERRED EMBODIMENTS

Figure 1:
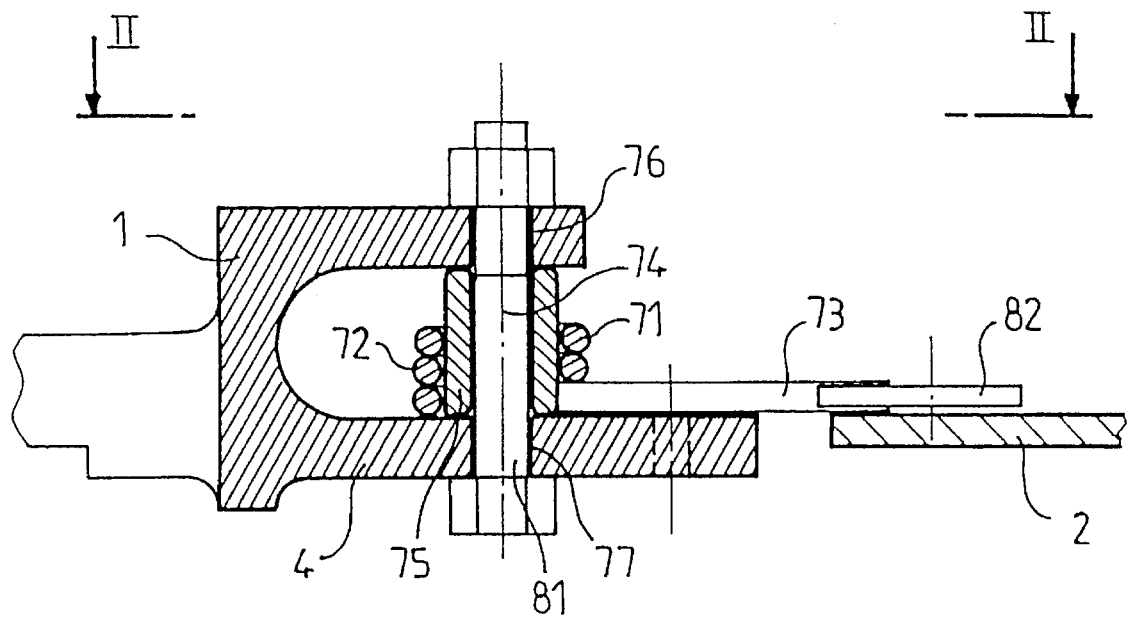
FIG. 1 is an axial view of an energy-absorbing device of the invention.
Figure 2:
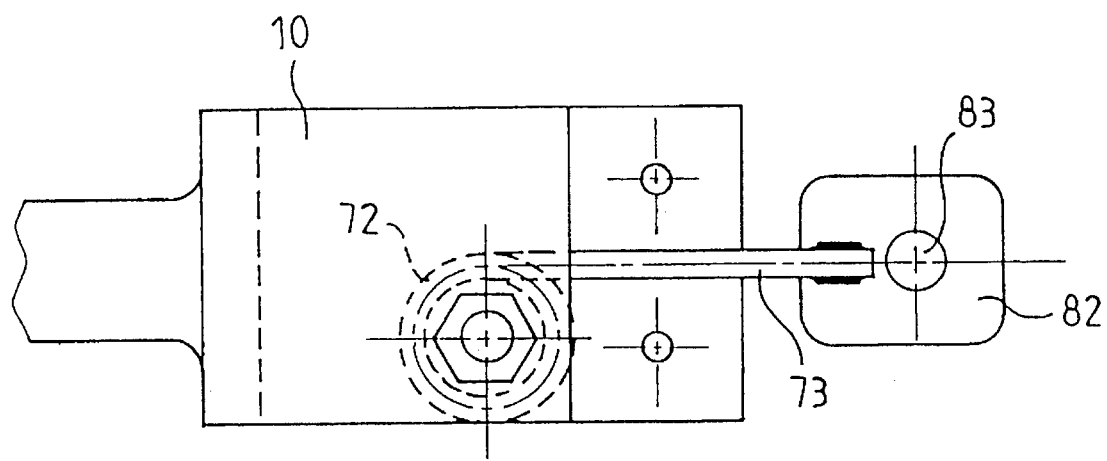
FIG. 2 is a view along line II—II of FIG. 1.

As can be seen in particular in FIGS. 1 and 2, the energy-absorbing device of the invention is interposed between two elements 1 and 2. This energy-absorbing energy device essentially comprises a wire 71 of which a rectilinear part 73 is fixed by its free end to element 2 and a winding 72 which works with a supporting axis mounted on element 1.

In the embodiment shown in FIGS. 1 and 2, this supporting axis is made up of a sleeve or spacer 75, arranged between the two arms 76 and 77 of element 1. A bolt 81 holds the assembly in position. Sleeve 75 can turn about the shank of bolt 81. The end of winding 72 of the wire can be fixed to sleeve 75.

The other end of wire 71 is fixed to element 2. For this purpose, a securing plate 82 is welded onto the end of part 73 of wire 71, if said wire is metallic. This securing plate 82 comprises a passage hole 83 intended to receive a means for securing said plate to element 2.

According to one embodiment of the invention, wire 71, wound around sleeve 75, unwinds plastically in the case of traction force caused by the moving apart of elements 1 and 2. Thus, as will be seen later, in the application to an automobile vehicle steering column, the external traction force is produced in the event of an impact. Since sleeve 75 is able to move in rotation, winding 72 of wire 71 unwinds under the action of the traction force. The force required to unwind wire 71 is predetermined to dampen and absorb the force applied. In the final position, wire 71 can be partially or entirely unwound. Total unwinding corresponds to the maximum value of the force likely to be absorbed.

In order to be able to modulate the energy to be absorbed, the cross-section of the wire 71 can be constant or evolutive. In the same way, the winding diameter of wire 71 in winding 72 is constant or evolutive. The nature of the wire can also be played upon, since it can be metallic or made from a plastic material.

Tests have shown that the level of force is very constant over the whole distance of travel of the unwinding of wire 71. The energy-absorbing device of the invention therefore has the considerable advantage of being able to absorb as constant a force as possible over a large distance of travel.

Due to its constitution, wire 71 makes it possible to absorb a force over a long length. In an embodiment of the type shown for the purposes of an example in FIGS. 1 and 2, the outside diameter of sleeve 75 is 20 mm and the average winding diameter of wire 71 is 25 mm. Thus, each wound turn makes it possible to absorb a force over a distance of travel of approximately 78 mm. With three wound turns and an unused dead half-turn serving to hold wire 71 on sleeve 75, the total distance of travel is therefore in the order of 230 mm. The overall dimensions of the assembly prior to unwinding corresponds to a 30 mm cylinder approximately 50 mm in height, for a 1000 Newton unwinding force.

The inside diameter and thickness of sleeve 75 must be chosen to prevent sleeve 75 from deforming in a significant manner under the forces induced by the unwinding of wire 71 and sticking on the axis formed by the shank of bolt 81.

In view of this, the minimum possible winding diameter of wire 71 is in the region of that defined above. It is on the other hand possible to modify the material and diameter of wire 71. These parameters are generally easy to master in production. In the system just described, rubbing only occurs in the articulation of sleeve 75 and of the axis formed by bolt 81.

According to the invention, the cross-section of the wire can be circular, square, rectangular or any other shape.

According to the invention, it should also be noted that wire 71 can be made from steel or any other material. Wire 71 can also be made to unwind in any plane, such as horizontal or vertical. Sleeve 75 can be made from metal or from a plastic material.

Figure 3:
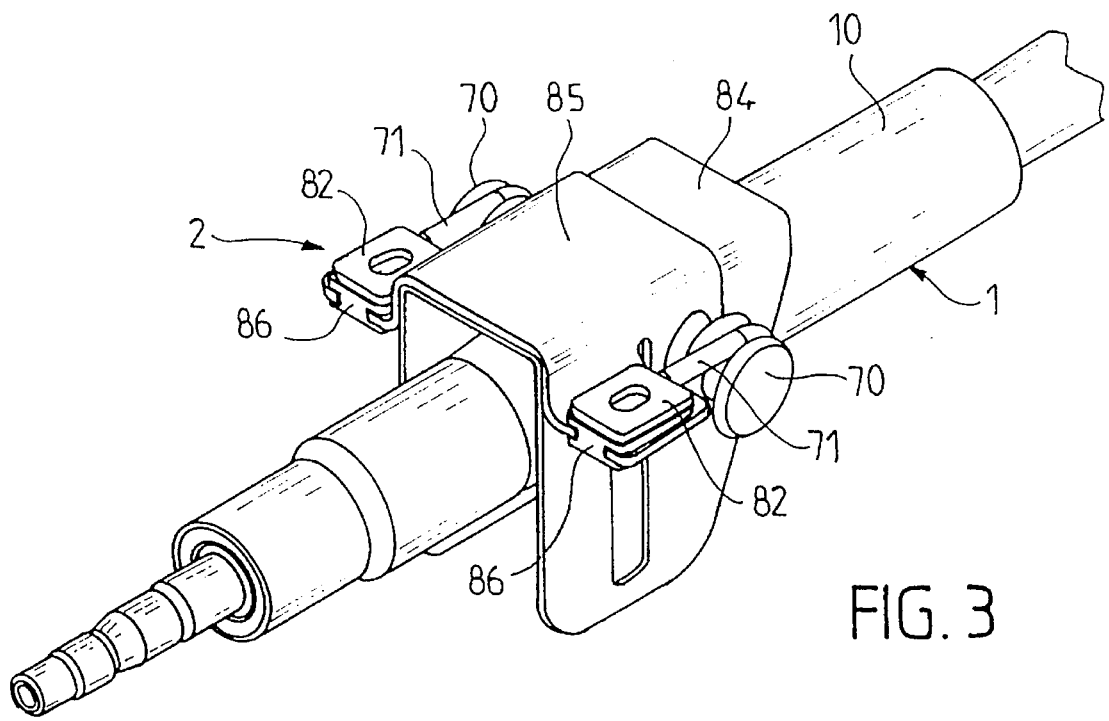
FIG. 3 is a view in perspective of an automobile vehicle steering column with an energy-absorbing device of the invention.
Figure 4:
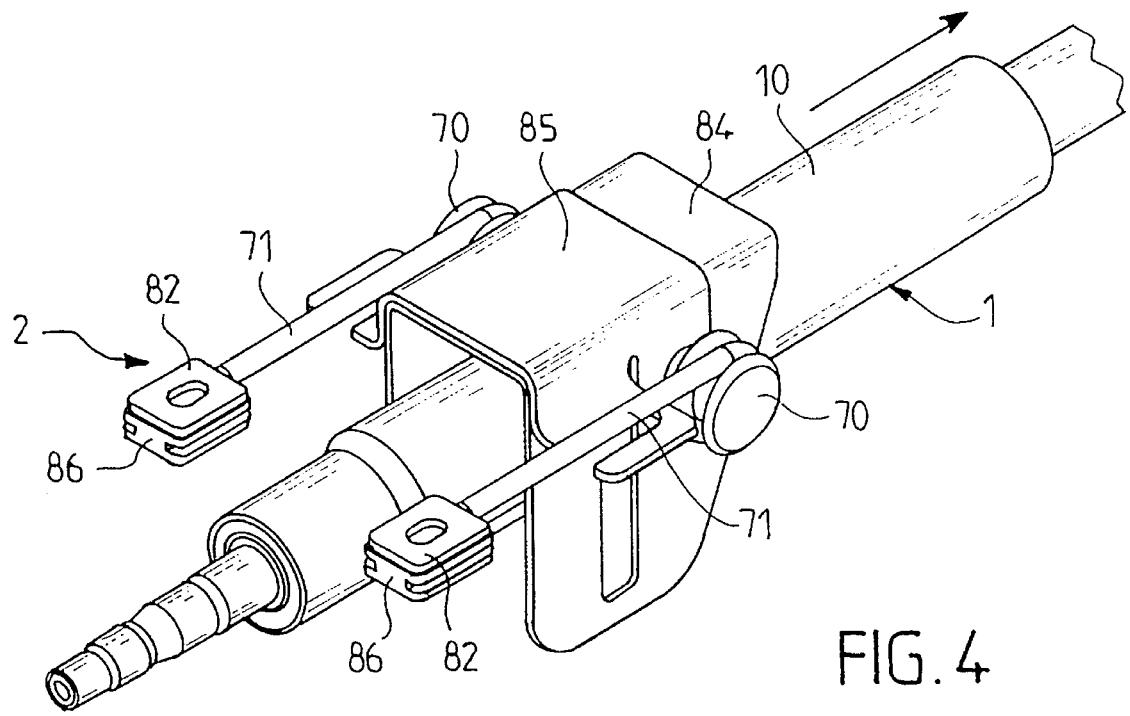
FIG. 4 is a view similar to FIG. 3 but after an impact.

FIGS. 3 and 4 show a case of application of the energy-absorbing device of the invention, which is mounted on a steering column of an automobile vehicle. The steering shaft is mounted in a body-tube 10. This body-tube 10 is supported and locked to the vehicle body in the desired position. A support is fixed to the vehicle body and receives the body-tube. Body-tube 10 comprises a column fixing bracket 84 and a column support 85.

An energy-absorbing device 70 of the invention is arranged either side of body-tube 10. The winding 72 of wire 71 of each energy-absorbing device 70 is mounted on a holding axis of a bolt 81 rigidly locked to body-tube 10. A securing plate 82 receives the end of rectilinear part 73 of wire 71 and is fixed to vehicle body 2. Each securing plate 82 is mounted on a clip-type releasable securing system. In this case of application, rectilinear part 73 is located above the holding axis.

In the event of an impact, the energy-absorbing system serves to lock the body-tube thanks to the overtightening, and the steering wheel retracts, which causes securing system 86 to unclip. Energy-absorbing device 70 is thus held rigidly locked to column support 85 by its securing plate 82. At the same time, the column continues to retract, driving with it fixing bracket 84 and wire holding axis 71.

The displacement between the column support 85 and fixing bracket 84 causes a tension in wire 71. This tension causes winding 72 on the holding axis formed by bolt 81 to unwind. This unwinding results in a resisting force allowing energy to be absorbed. The energy-absorbing level is thus controlled by the diameter of wire 71 in winding 72, the winding diameter of this wire 71, as well as its material.

The energy-absorbing device 70 of the invention thus has the advantage of offering controlled energy absorption in a reduced space.

In the embodiments described herein above, an assembly was illustrated in which winding 72 of wire 71 works with a sleeve or spacer mounted on the shank of bolt 81. Such an arrangement is not however mandatory. Indeed, winding 72 can be mounted directly on the shank of bolt 81; this can then be greased, or alternatively surface treated. According to a modified embodiment, winding 72 can be wound on a free-moving bearing to avoid dispersion of rubbing.

In its application to automobile vehicle steering columns, the holding axis of wire 71 can be fixed onto brackets fixed to body-tube 10, or fixed directly to body-tube 10. It is also possible to fix the holding axis onto column support 85. In addition, unclipping can be achieved at the level of the column body-tube rather than at the level of securing plate 82.

Figure 5:
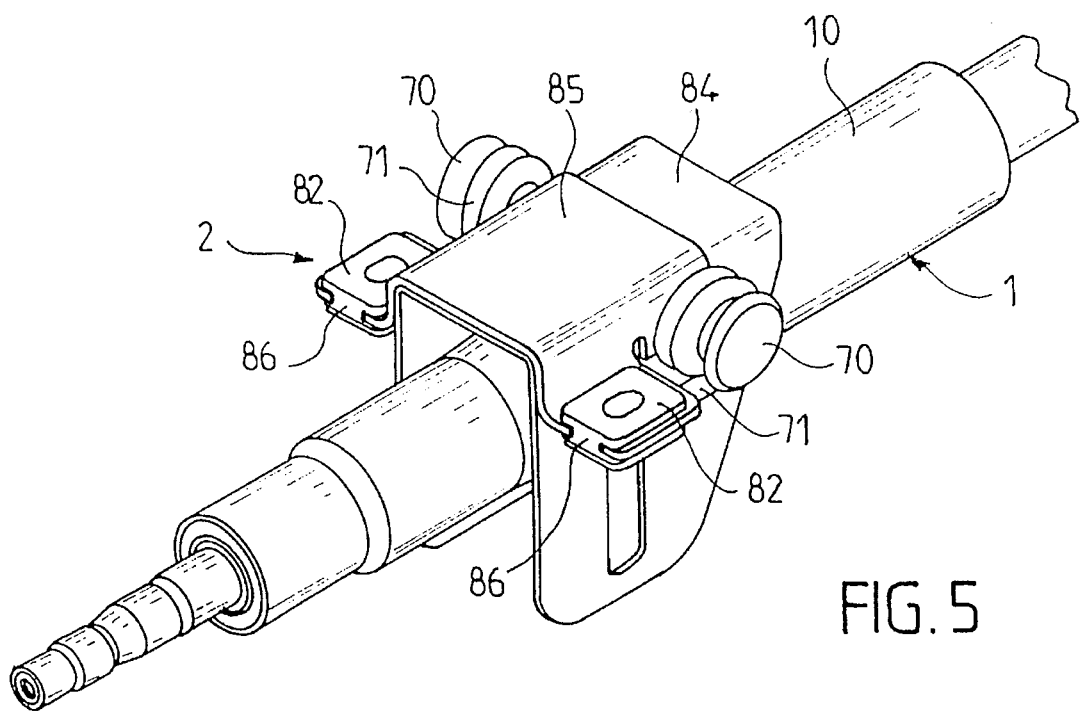
FIG. 5 is a view in perspective of an automobile vehicle steering column with an energy-absorbing device according to another embodiment of the invention.
Figure 6:
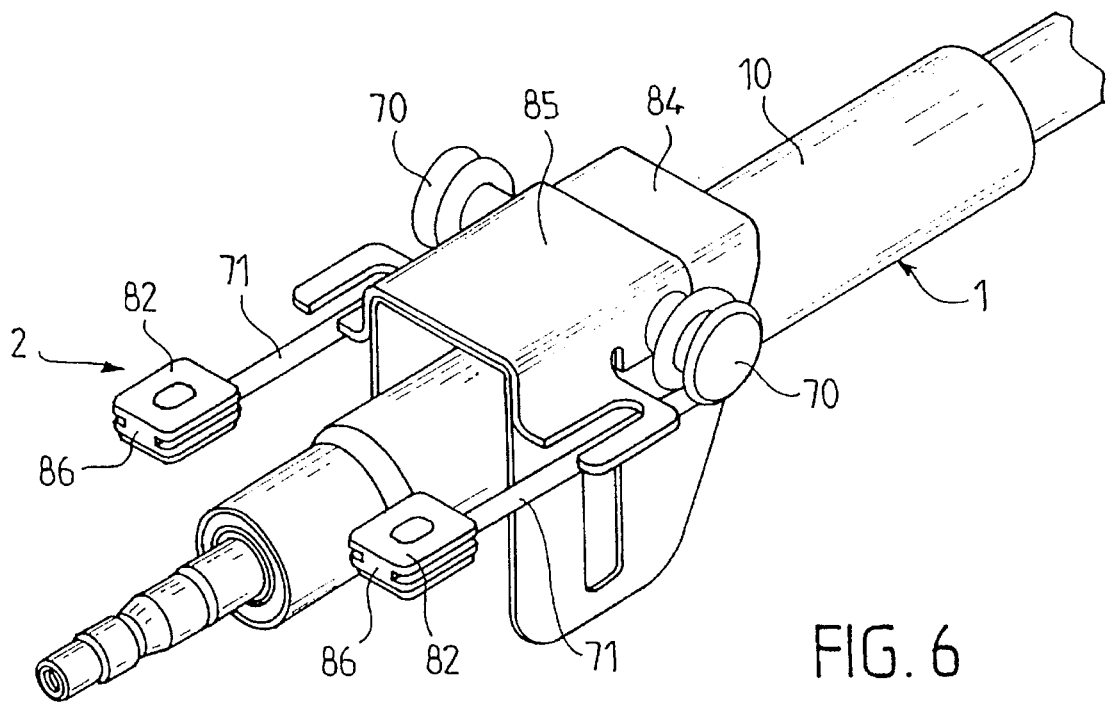
FIG. 6 is a view similar to FIG. 5 but after an impact.

FIGS. 5 and 6 show a steering column comprising an energy-absorbing device 70 arranged each side of body-tube 10. Winding 72 of wire 71 of each energy-absorbing device is mounted on a holding axis rigidly locked to body-tube 10. Securing plate 82 at the end of rectilinear part 73 of wire 71 is fixed onto vehicle body 2 such that the rectilinear part (73) of the wire is located below the holding axis.

Figure 7:
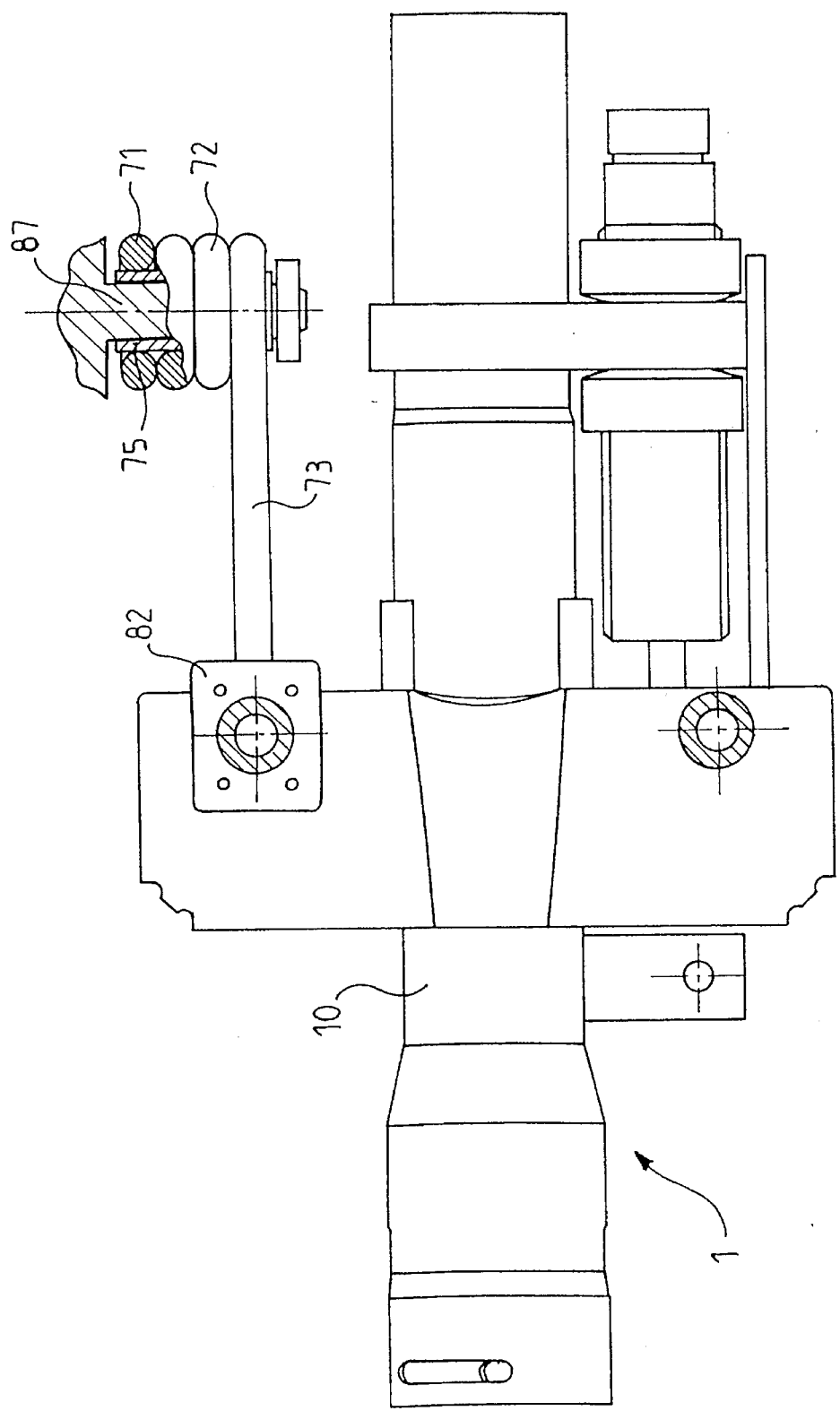
FIG. 7 is a view from above of an automobile vehicle steering column with an energy-absorbing device according to another embodiment of the invention.

The steering column shown in FIG. 7 comprises an energy-absorbing device arranged on one side of body-tube 10. The winding 72 of wire 71 of the energy-absorbing device is mounted on a holding axis 87 rigidly locked to the vehicle body. Securing plate 82 at the end of rectilinear part 73 of wire 71 is fixed to body-tube 10 such that rectilinear part 73 of the wire is located above holding axis 87.

The reference signs inserted after the technical characteristics mentioned in the claims serve only to facilitate comprehension of said claims and in no way limit their scope.

We claim:

1. An energy-absorbing device disposed between two elements movable apart from each other in response to an externally applied force comprising:

a wire having a deformable coil winding having a plurality of turns and a rectilinear length portion extending from a turn of said coil winding;

a first element of said two elements having mounted thereon an axial core in said coil winding defining an axis about which said coil winding turns are wound axially and circumferentially of an axial length thereof;

an end turn of said coil winding having an end of said wire fixed to said axis;

a second one of said two elements having an end of said wire rectilinear length portion fixedly connected thereto; and said coil winding turns being deformable for unwinding about said axis to absorb energy of a force applied relatively separating the two elements in a direction parallel to said rectilinear length portion.

2. An energy-absorbing device according to claim 1, in which the cross-section of the wire is constant or evolutive.

3. An energy-absorbing device according according to claim 1, in which the coil winding diameter is constant or evolutive.

4. An energy-absorbing device according to claim 1, in which said wire is metallic.

5. An energy-absorbing device according to claim 1, in which said wire is made of a plastic.

6. An energy-absorbing device according to claim 1, in which said first element has a U-shaped part, and said axis of said coil winding is a rod disposed between two wings of said U-shaped part.

7. An energy-absorbing device according to claim 1, in which said first element has a U-shaped part, and said axis of said coil winding is a bolt disposed between two wings of said U-shaped part.

8. An energy-absorbing device according to claim 7, in which a sleeve is disposed circumferentially of said bolt rotatable thereon; and in which turns are wound on said sleeve.

9. An energy-absorbing device according to claim 1, in which said first element has a U-shaped part, and said axis of said coil winding is a rod extending between two wings of said U-shaped part, and said coil winding turns are wound on said rod.

10. In an automobile vehicle steering column having a steering shaft, a body-tube mounting said steering shaft and supported on the vehicle body and locked thereto in a selected position; said steering column comprising an energy-absorbing device mounted thereon between the body-tube and vehicle body for absorbing energy of a force of an impact moving the body-tube and vehicle body relatively apart; said energy-absorbing device comprising a wire having a winding at one end and a rectilinear length portion at another end fixed relative to the vehicle body and extending between the body-tube and the vehicle body; a supporting axis in said winding mounted fixed to said body-tube with turns of said winding axially of the axis; said turns of the winding being deformable for unwinding to absorb energy of said force of an impact in a direction parallel to said body tube and said rectilinear length portion and effective to move the body-tube and the vehicle body relatively apart.

11. An automobile vehicle steering column according to claim 10, including a second energy-absorbing device on an opposite side of the body-tube than the first-mentioned energy-absorbing device.

\* \* \* \* \*